(12) United States Patent
Chen et al.

(10) Patent No.: US 9,268,595 B2
(45) Date of Patent: Feb. 23, 2016

(54) SCHEDULING THREAD EXECUTION BASED ON THREAD AFFINITY

(75) Inventors: Feng Chen, Shanghai (CN); Yan Hao, Shanghai (CN); Jin Fu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 13/993,706

(22) PCT Filed: Nov. 15, 2011

(86) PCT No.: PCT/CN2011/082215
§ 371 (c)(1),
(2), (4) Date: Jun. 13, 2013

(87) PCT Pub. No.: WO2013/071485
PCT Pub. Date: May 23, 2013

(65) Prior Publication Data
US 2013/0290971 A1   Oct. 31, 2013

(51) Int. Cl.
*G06F 9/46* (2006.01)
*G06F 9/48* (2006.01)
*G06T 15/00* (2011.01)
*G06F 9/50* (2006.01)

(52) U.S. Cl.
CPC ............... *G06F 9/46* (2013.01); *G06F 9/4881* (2013.01); *G06F 9/5033* (2013.01); *G06T 15/00* (2013.01)

(58) Field of Classification Search
CPC .................................................... G06F 9/4881
See application file for complete search history.

(56) References Cited

U.S. PATENT DOCUMENTS

| 5,467,459 A * | 11/1995 | Alexander et al. ............ 711/153 |
| 7,467,383 B2 * | 12/2008 | Inchingolo et al. ........... 718/104 |
| 2009/0113284 A1 * | 4/2009 | Kulkarni et al. .............. 715/219 |
| 2009/0187915 A1 * | 7/2009 | Chew et al. ................... 718/104 |

FOREIGN PATENT DOCUMENTS

| CN | 101076783 | 11/2007 |
| CN | 101286138 | 10/2008 |
| CN | 101615120 | 12/2009 |

OTHER PUBLICATIONS

PCT International Search Report and Written Opinion issued in corresponding PCT/CN2011/082215 dated Jul. 19, 2012 (10 pages).

* cited by examiner

*Primary Examiner* — Camquy Truong
(74) *Attorney, Agent, or Firm* — Trop Pruner & Hu, P.C.

(57) ABSTRACT

In accordance with some embodiments, spatial and temporal locality between threads executing on graphics processing units may be analyzed and tracked in order to improve performance. In some applications where a large number of threads are executed and those threads use common resources such as common data, affinity tracking may be used to improve performance by reducing the cache miss rate and to more effectively use relatively small-sized caches.

15 Claims, 10 Drawing Sheets

| N=4 | AFFINITY ID | HIT COUNTER | PREV SLOT | |
|---|---|---|---|---|
| ↑ | 0xAADA | 0 | 3 | ← TAIL |
| STATUS1 | 0x5525 | 0 | 2 | |
| ↓ | 0x3800 | 0 | 1 | |
| 1 | 0xF | 0 | NULL | |

| N=4 | AFFINITY ID | HIT COUNTER | PREV SLOT | |
|---|---|---|---|---|
| ↑ | 0xAADA | 1 | 3 | ← TAIL |
| STATUS2 | 0x5525 | 1 | 2 | |
| ↓ | 0x3800 | 0 | 1 | |
| 1 | 0xF | 0 | NULL | |

| N=4 | AFFINITY ID | HIT COUNTER | PREV SLOT | |
|---|---|---|---|---|
| ↑ | 0xAADA | 1 | 3 | ← TAIL |
| STATUS3 | 0x5525 | 1 | 2 | |
| ↓ | 0x360 | 0 | 1 | |
| 1 | 0x7 | 0 | NULL | |

FIG. 9

SCHEDULING THREAD EXECUTION BASED ON THREAD AFFINITY

BACKGROUND

This relates generally graphics processing units.

In many computing platforms, separate central processing and graphics processing units may be used. Graphics processing tasks may be offloaded from central processors to graphics processors. Graphics processors may perform a number of specialized tasks including graphics tasks and financial analysis tasks. Typically where heavy mathematical operations are involved, tasks may be offloaded to the graphics processor.

For example, in financial analysis, a Monte Carlo simulation may be performed. A Monte Carlo simulation predicts option prices based on average prices and variances of stock prices. Graphics processors may be used to do these simulations using thousands of threads. Generally the sequence of thread execution is not optimized and is simply taken in a thread by thread execution order.

BRIEF DESCRIPTION OF THE DRAWINGS

FIG. 9 is a depiction of affinity history buffer updating in accordance with one embodiment;

DETAILED DESCRIPTION

Figure 1:
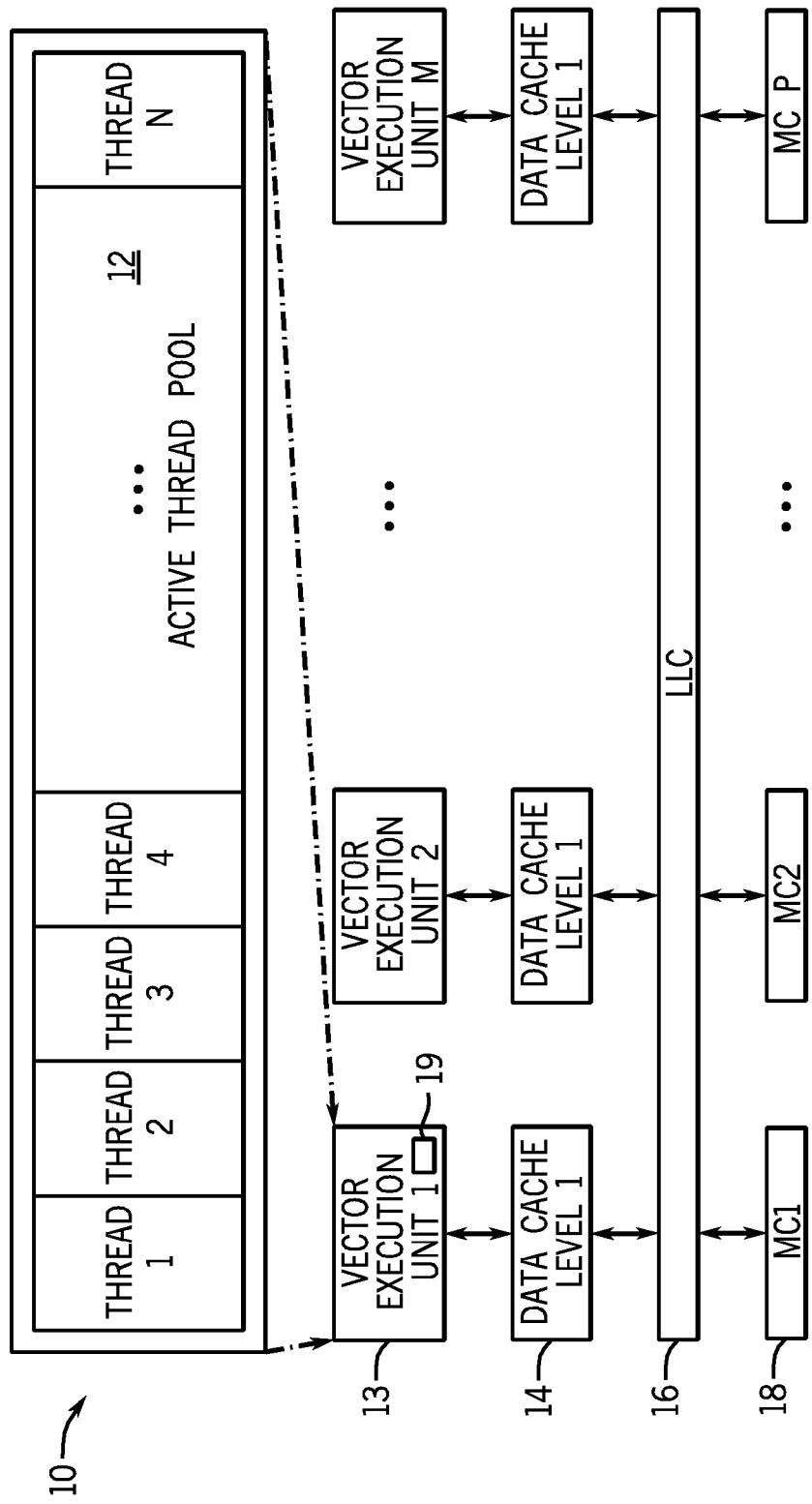
FIG. 1 is a depiction of a graphics processing unit architecture in accordance with one embodiment.

In accordance with some embodiments, spatial and temporal locality between threads executing on graphics processing units may be analyzed and tracked in order to improve performance. In some applications where a large number of threads are executed and those threads use common resources such as common data, affinity tracking may be used to improve performance by reducing the cache miss rate and to more effectively use relatively small-sized caches.

In some embodiments, a task may be broken into a large number of steps and the task may be repeated for a number of different cases. By calculating the same step across a number of cases, each executed by different groups of threads, affinity between the thread groups may be used to improve performance.

One possible application of affinity analysis is graphics processing for a Monte Carlo simulation using thousands of threads. A large number of threads such as 128 or 256 threads may be used to calculate each stock option price. A large number of options may be analyzed, for example 10,000 option prices may be calculated at a time. However, different options may use the same state inputs that provide a random number. Thus an opportunity for affinity based performance improvements may be realized because different groups of threads may share the use of a common resource, in this case, a state input. Since graphics processing unit cache size may be relatively small compared to that of central processing units, affinity analysis may be particularly amenable to improving performance in graphics units.

Thus instead of calculating the stock option price, one option after the other, the option price may be calculated by breaking the calculation into a plurality of steps and performing one step across a number of options. Calculating the option price one after the other may be inefficient because two groups of threads may access the same data set. Thus through the use of locality identification and exploitation across thread groups, performance may be improved, when breaking up the calculation into a plurality of steps and calculating the same step for a large number of options.

More specifically, the sequence of thread execution may be reordered or rescheduled to take advantage of locality between threads. Again looking at the example of a Monte Carlo simulation, the simulation calculation may be broken into about one hundred steps. For one example, the first step may be done for a first option and then the calculation may be suspended, followed by doing the first step for a second option and then suspending it and so on. This may reduce the amount of information in the caches so that spatial locality may be used advantageously across thread groups.

As a result cache miss rates may be reduced in some embodiments. Thus by identifying localities across groups of threads, performance benefits may be achieved by scheduling the order of execution of threads to take advantage of locality between thread groups. Basically, thread groups that have locality may be executed sequentially.

The same locality benefits may arise in a number of graphics processing tasks, including those generally associated with pixel shaders, because they require different texture resources at different parts of the calculations.

Referring to FIG. 1, in accordance with a graphics processing unit throughput computing architecture 10, an active thread pool 12 may include a number of threads for one single vector execution unit 13. In other words, each vector execution unit 13 may include an active thread pool 12. Thus each vector execution unit may, in one embodiment, be used to determine an option price for one particular stock.

In accordance with some embodiments of the present invention, each vector execution unit may include a scheduler that includes an affinity history buffer 19. The affinity history buffer may be used for tracking affinity between threads. The scheduler can use this information to execute threads in an order that takes advantage of any detected affinity.

Each vector execution unit includes a data level one cache 14, which in turn is connected to any number of higher level caches including a last level cache (LLC) 16. A memory controller 18 may be coupled to the data caches.

As used herein, "resource access affinity" or "affinity" is the result of two different threads using substantially the same resources so that performance advantages may be obtained by scheduling the threads that have affinity to be sequential or substantially sequential. As a result of breaking computing tasks up and executing them on different threads, temporal and spatial locality may be lost. By analyzing spatial and temporal locality, threads may be rescheduled to execute sequentially when they have affinity. This may result in improving the cache hit ratio and memory request coalescing efficiency. An affinity history buffer detects and tracks dominant resource access affinity.

Figure 2:
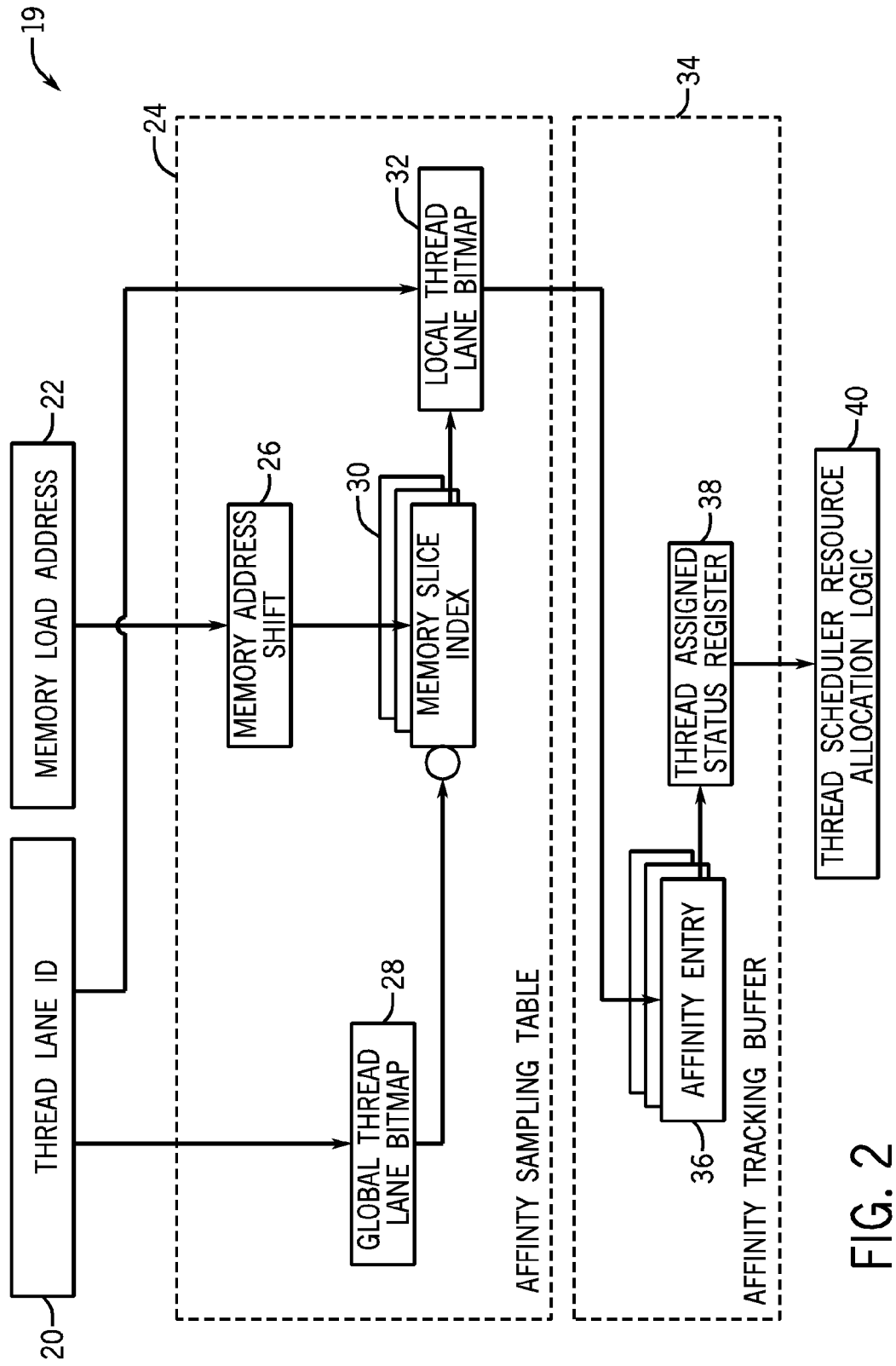
FIG. 2 is a schematic depiction of an affinity history buffer for use in the embodiment of FIG. 1.

Thus referring to FIG. 2, a more detailed depiction of the affinity history buffer 19 shown in FIG. 1 is provided. Thread lane identifier 20 feeds thread lane identifiers to global thread lane bitmaps 28 and local thread lane bitmaps 32. Memory load address buffer 22 provides a load address to a memory shift register 26. The memory shift register 26 shifts the memory address in some regular way in order to find memory addresses that have affinity. The output of the thread lane bitmap 28 is provided to a memory slice index 30 that also receives the address shift. The output is a local thread lane bitmap 32 that forms an affinity sampling table 24.

The output from the local thread lane bitmap 32 is provided as an affinity entry 36. The affinity entry may be provided to a thread assigned status register 38 and ultimately to the thread scheduler or resource allocation logic 40 of the vector execution unit 13 shown in FIG. 1.

Figure 3:
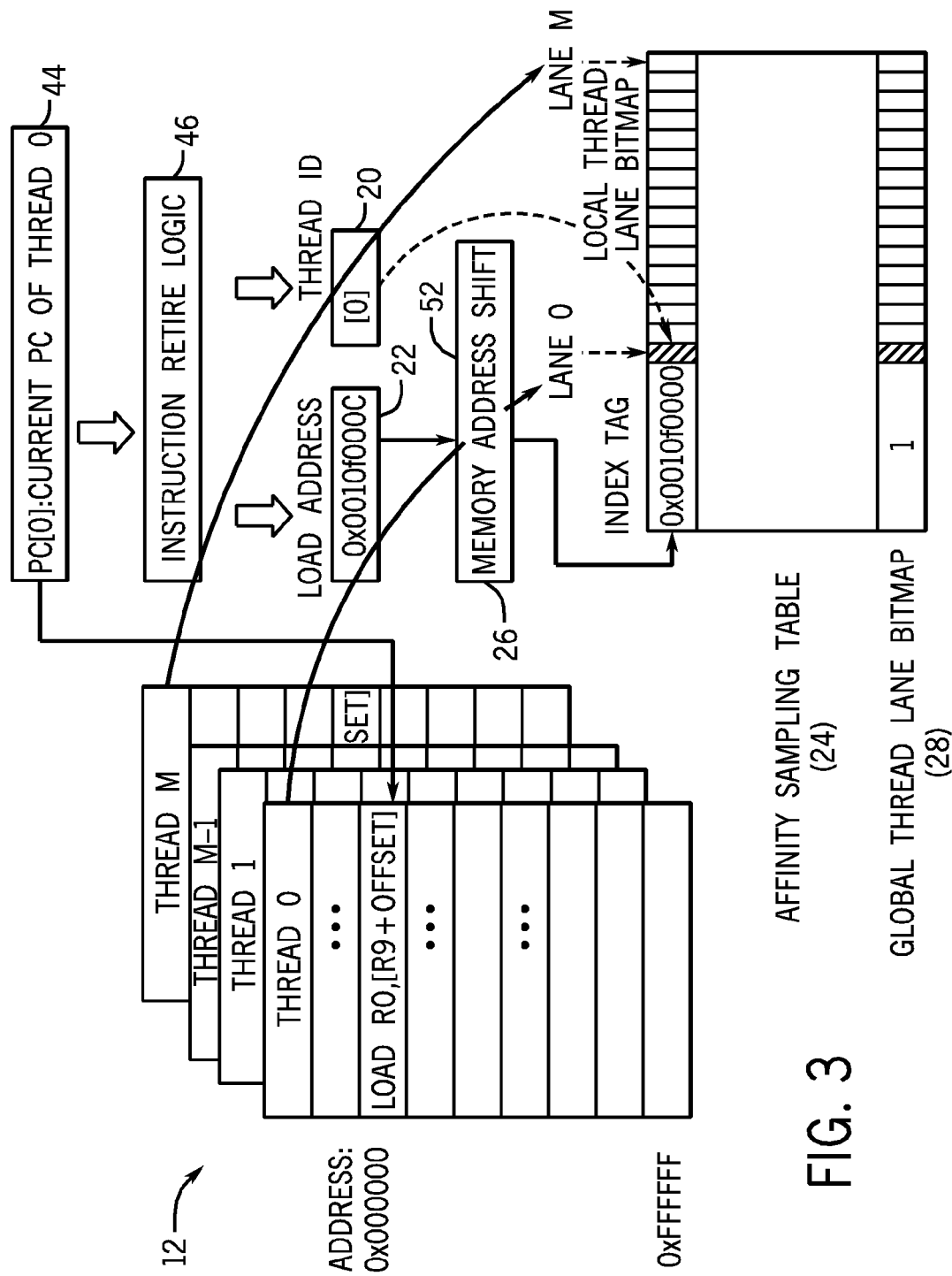
FIG. 3 is a schematic depiction of an affinity sampling table for use in connection with the embodiment of FIG. 1.

The memory address shift logic 26 shown in FIGS. 2 and 3 may be a configurable bit-wise shift register. The number of bytes to be shifted and the shift direction may be configured by a driver 22 (FIG. 3). The driver sets the number of bits based on available cache resource size and workload access granularity. Its input is a virtual address of a memory load operation (blocks 44 and 46 of FIG. 3) from the memory load address 22 (FIG. 3). Its output is called a memory slice index 30.

Actually, the memory address shift logic may use other bit-wise operations rather than a normal shift. For example, for two-dimensional based texture access, a right shifting operation may be adjusted based on different tiling algorithms. If threads with the same memory slice index, there is space and/or time locality among those threads. The number of bits to be shifted determines the tolerance of locality.

The global thread lane bitmap 28 is a register whose bit number is the same as the active thread pool size. For a given kernel, if the graphic processing unit hardware's resource could maintain forty threads, the register may be five bytes in length. If the maximum thread number is thirty two, its length is one word. Its bits are used as a bitmap to map each hardware thread in a pool. For example, the first thread in a pool is mapped to a less significant bit. If one bit of the global thread lane bitmap is set, it stands for a corresponding thread being passed through affinity sampling procedure and vice versa.

The affinity sampling table 24 (FIG. 3) is a two-dimensional table. For each entry in the table, its index field is a memory slice index. Its value field is a local thread lane bitmap. The memory slice index comes from the output of the memory address shift logic 26. The local thread lane bitmap is a bitmap treated with the same semantics as the global thread lane bitmap 28. If one bit of the local thread lane bitmap is set to one, this means that the corresponding hardware thread's memory slice index equals to the entry's index field. So threads embodying space and/or time locality may be clustered to the same entry. The value of the local thread lane bitmap may be interpreted as an affinity identifier as well. For N elements in the active thread pool, a valid value scope of affinity identifier is from zero to $2^N$.

The affinity tracking buffer 34 includes two components. A first component including the affinity entries 36. This is a buffer designed to track hot affinity identifiers through the access history. The second component is a thread assigned status register 38. The input to this subsystem is the affinity identifier and the output is the hot affinity identifier.

Figure 4:
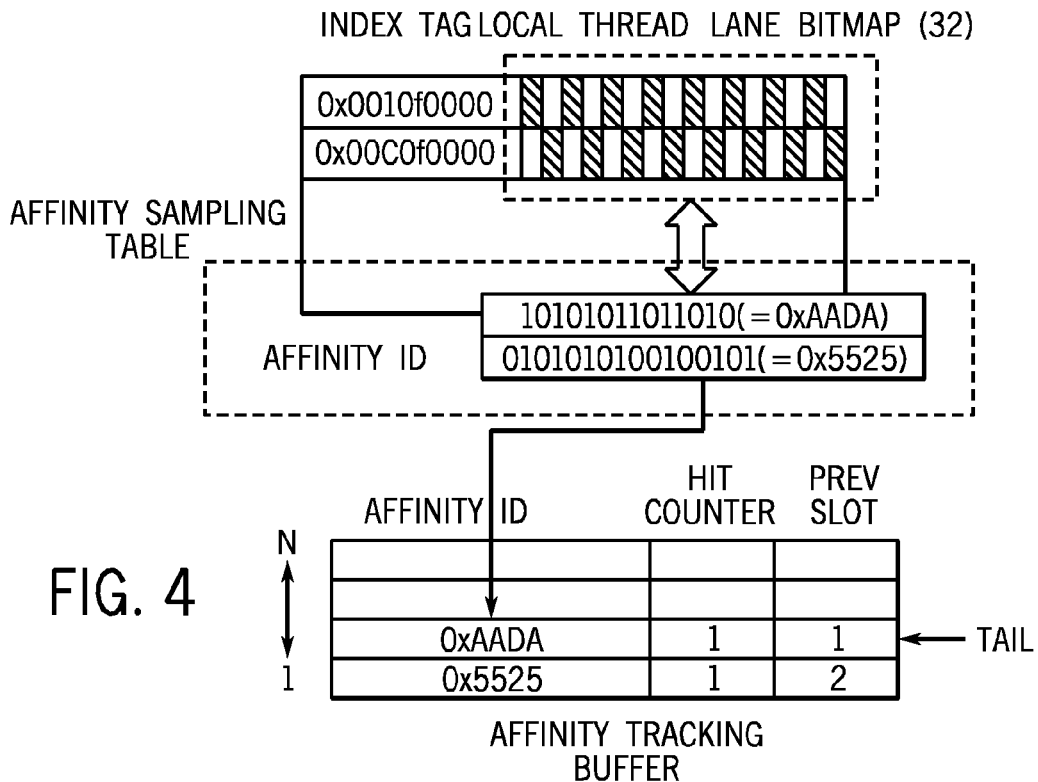
FIG. 4 is a more detailed depiction of an affinity tracking buffer.

The affinity tracking buffer 34 is the core unit of this subsystem. An enlarged view of the affinity tracking buffer is shown in FIG. 4. It is a fixed size two-dimensional table. Each entry in the tracking buffer contains one index and two value fields. The content of the index field is the affinity identifier 66. The first value field is a hit counter that records the appearance of a given affinity identifier 66 across a series of sampling. Its initial value is zero if the affinity identifier is inserted into the table for the first time. The second value is the previous slot ("PREV SLOT").

The content of the previous slot represents a slot in the affinity tracking buffer. For an N slot affinity tracking buffer design, the previous slot's value scope is from one to N.

The previous slot is used to set up an ordered linked list in the affinity tracking buffer. That list is then used to maintain a two-level priority queue for entry replacement and output. The first level of priority in this queue is a hit rate. The entry with the highest value in the hit counter will be least likely to be replaced and most likely to be outputted to the outside system. The second level of priority is the lifetime of the entry. For entries with the same hit count value, the youngest entry will be the least likely to be replaced and most likely to be outputted to the outside system. The previous slot value points to the next hot entry in this linked list. To speed up the affinity information output, the tail of this linked list is maintained. It points to the hottest affinity group index.

Figure 5:
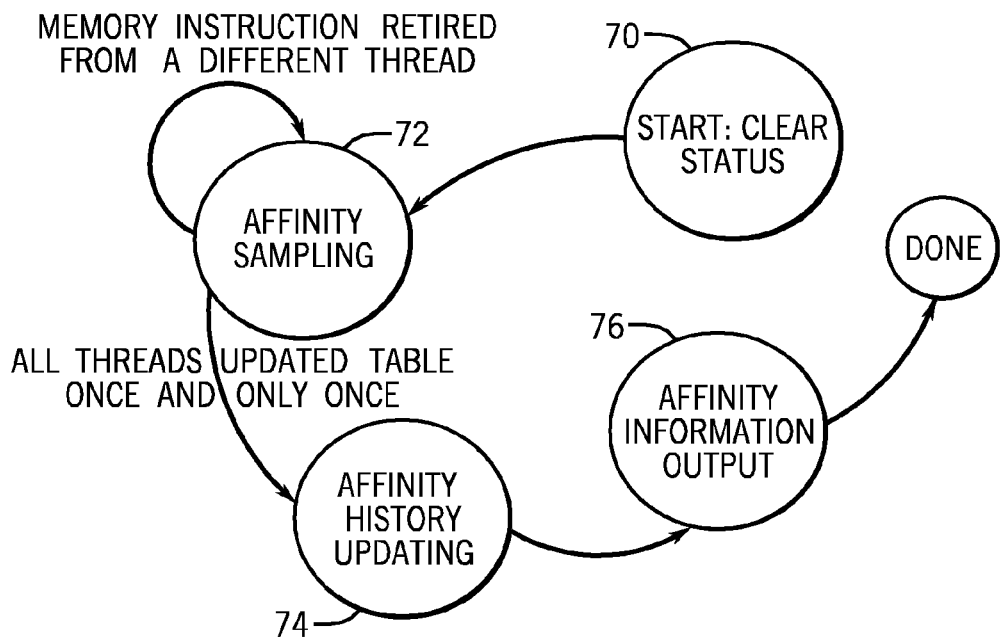
FIG. 5 is a state diagram for affinity detection in accordance with one embodiment.

Referring to FIG. 5, a state diagram for affinity detection with the affinity buffer is illustrated. Each iteration includes a start state 70, an affinity sampling state 72 where a memory instruction may be retired from a different thread, an affinity history updating state 74 that receives all threads updated table once and only once and affinity state output state as well as a stop state. The start state is a start point of the state machine. The content in the affinity sampling table is local to the iteration and will be set to zero in the start state. That action includes activities of making bits, flushing to zero for the affinity sample table and the global thread lane bitmap. In the affinity sampling state 72, the affinity sampling subsystem clusters affinity identifiers for the active thread pool. For each thread in the pool, the thread is sampled once and only once. The affinity history updating state 74 identifies and tracks a dominant affinity identifier of the current application. Its content is preserved across iterations. The state may be switched to an affinity information output stage 76 during which the hot affinity identifier is outputted.

Figure 6:
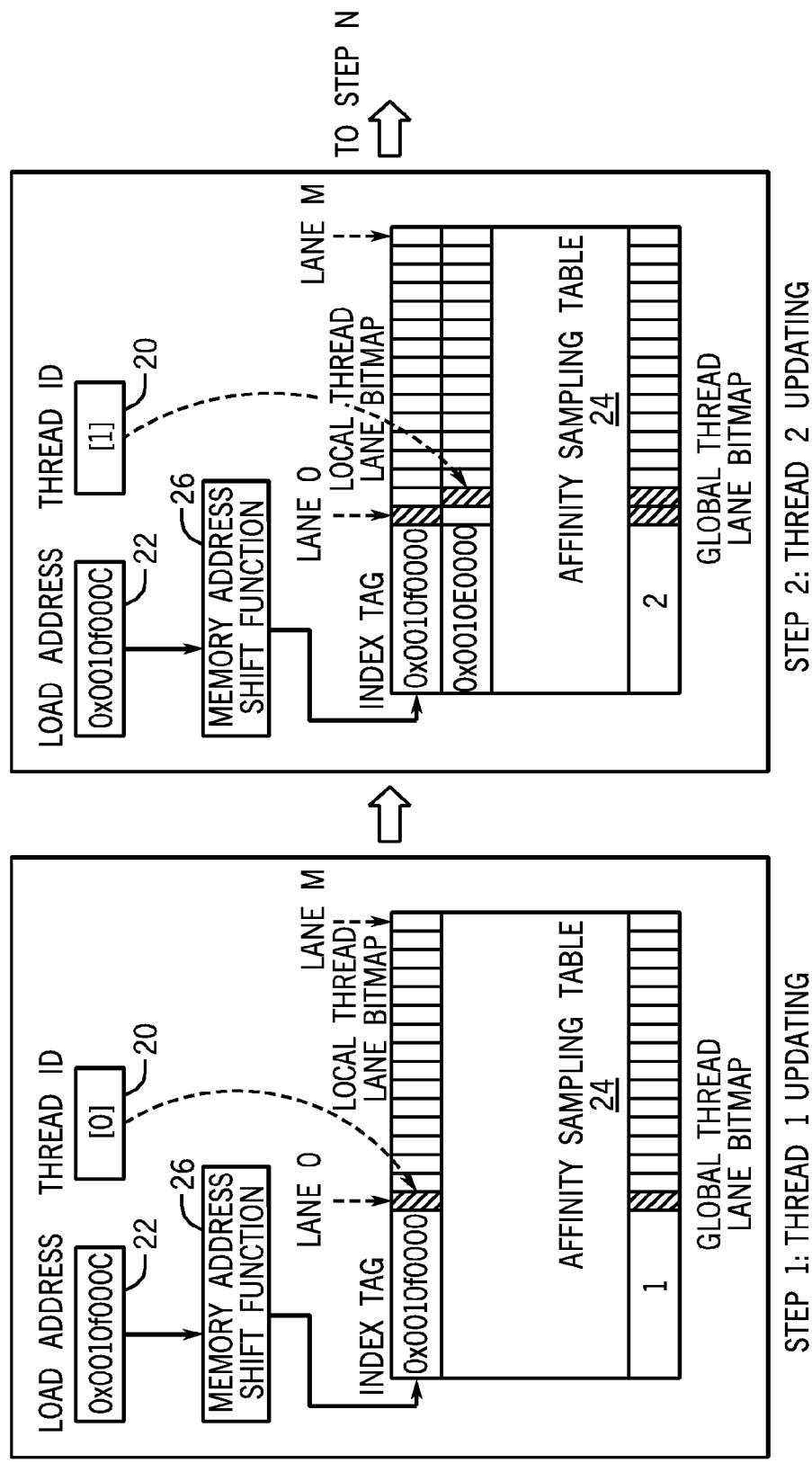
FIG. 6 is a schematic depiction of affinity sampling in accordance with one embodiment.

The affinity sampling state 72 is shown in more detail in FIG. 6. Using the example where the thread pool has M elements, thread zero is the first thread being sampled, the number "1" is shifted to the left zero times and the result would be to do a bit-wise AND operation with the value of the global thread lane bitmap. The result is zero which stands for thread zero is valid for sampling. The thread identifier and virtual address of the load operation is fed into the subsystem. Assuming a granularity of 4 K bytes for identity affinity access, address shifting logic is configured to shift 12 bits. The access address for thread zero is 0x0010f00c. The shifting result is 0x0010f. The subsystem search is through the affinity sampling table and finds a zero entry. A new entry is allocated for 0x0010f and is set to the corresponding bit of thread zero in the local thread lane bitmap field. Also, the corresponding bit in the global thread lane bitmap is set. Similar steps are carried out for the next thread, thread 1 which is illustrated in FIG. 6, Step 2.

Figure 7:
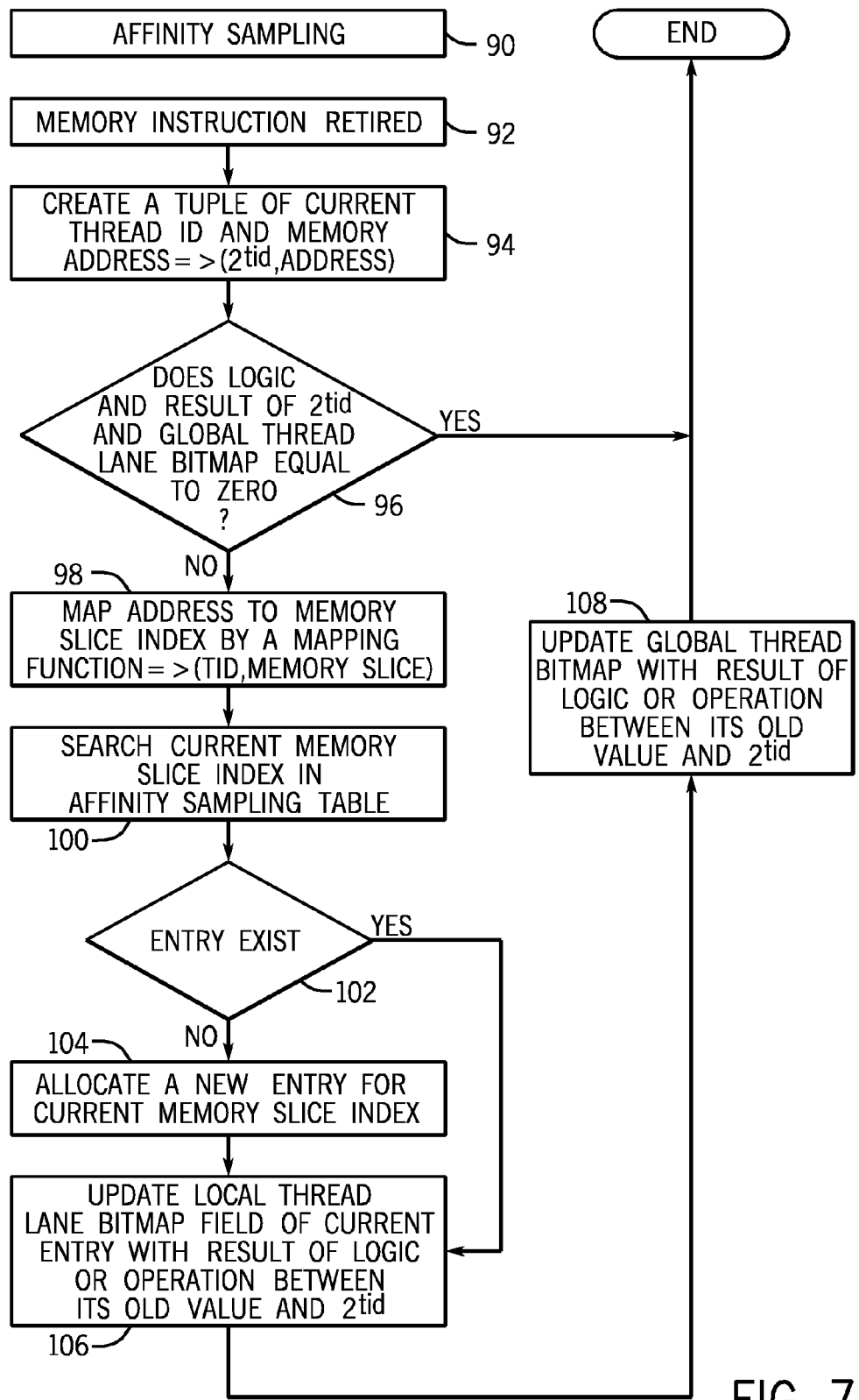
FIG. 7 is a flow chart for affinity sampling in accordance with one embodiment.

Referring to the sequence 90 shown in FIG. 7, the sequence may be implemented in hardware, software and/or firmware. In software and firmware embodiments it may be implemented by computer readable instructions stored in a non-transitory computer readable medium.

The sequence begins in block 92 when a memory instruction is retired. Then at block 94 a tuple of the thread identifier and the memory address is created. A check at diamond 96 determines whether the logical AND result of the tuple is equal to zero. If so, the flow ends. Otherwise at block 98, the address is mapped to a memory slice index by a mapping function.

Then at block 100, the current memory slice index is searched in the affinity sampling table. If the entry exists as determined in diamond 102, then the flow goes to step 106. Otherwise a new entry is allocated for the current memory slice index at block 104. In block 106, a local thread lane bitmap field is updated with the result of a logic or operation between its old value and the tuple. Then in block 108 the global thread bitmap is updated with the result of a logic or operation between its old value and the tuple.

Figure 8:
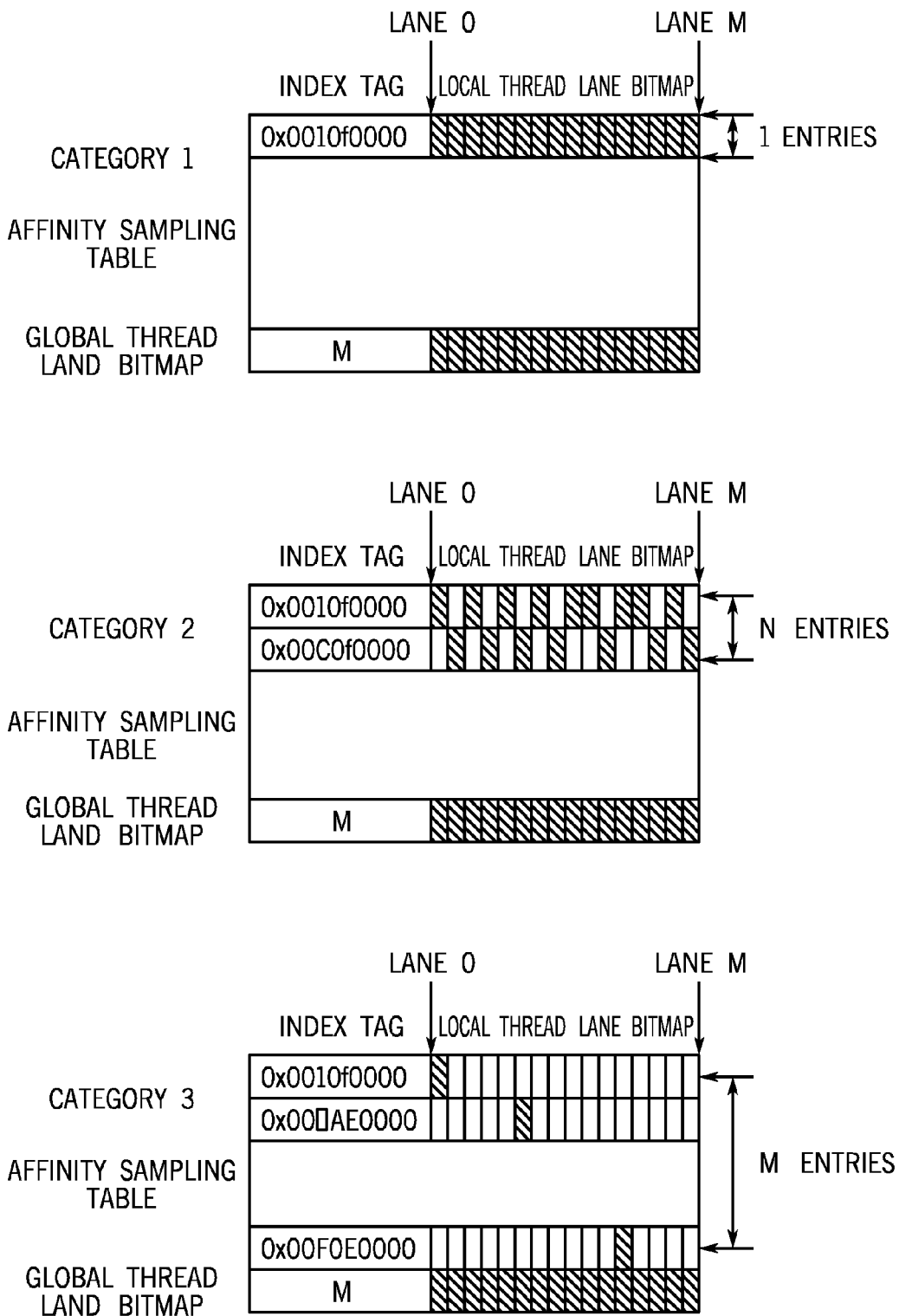
FIG. 8 is a depiction of affinity sampling states in accordance with one embodiment.

When affinity sampling is done, there are three possible statuses in the affinity sampling table, as shown in FIG. 8. For category 1 there is only one entry in the sampling table and it is called strong affinity. For category 2, there is at least one entry whose local thread lane bitmap is set more than once and is called significant affinity. In category 3, the entry number equals to the active thread pool size and this is called no affinity. For strong and significant affinity categories, a subsystem outputs a sampling result to the affinity tracking subsystem.

The affinity tracking buffer update corresponding to state 74 in FIG. 5 works like a cache. The affinity tracking buffer tracks hot affinity identifiers. Assuming there are four slots in the affinity tracking buffer before the first buffer updating takes place, there is no entry in the buffer, and all four slots are available for insert. After the first affinity sampling is done, the affinity identifier 0x3800 and 0xf is identified and filled into slots one and two. In the second affinity sampling stage the affinity identifier 0xAADA and 0x5525 is found and filled. From then on, there is no empty slot. The tail point to slot 4, is the most recently visited. The status of the tracking buffer is shown as status 1 in FIG. 9.

When the sampling table is ready for output for a third time, 0xAADA and 0x5525 is fed and the corresponding hit counters are increased which is shown in status 2 of FIG. 9. When the fourth sampling result is ready (identifiers 0x360 and 0x7) there is no empty slot available. The buffer eliminates the oldest entry with the lowest hit count, which in this case 0x3800 and 0xF in slots 1 and 2. The status is shown as status 3 in FIG. 9. The detailed control flow is shown in FIG. 10.

Figure 10:
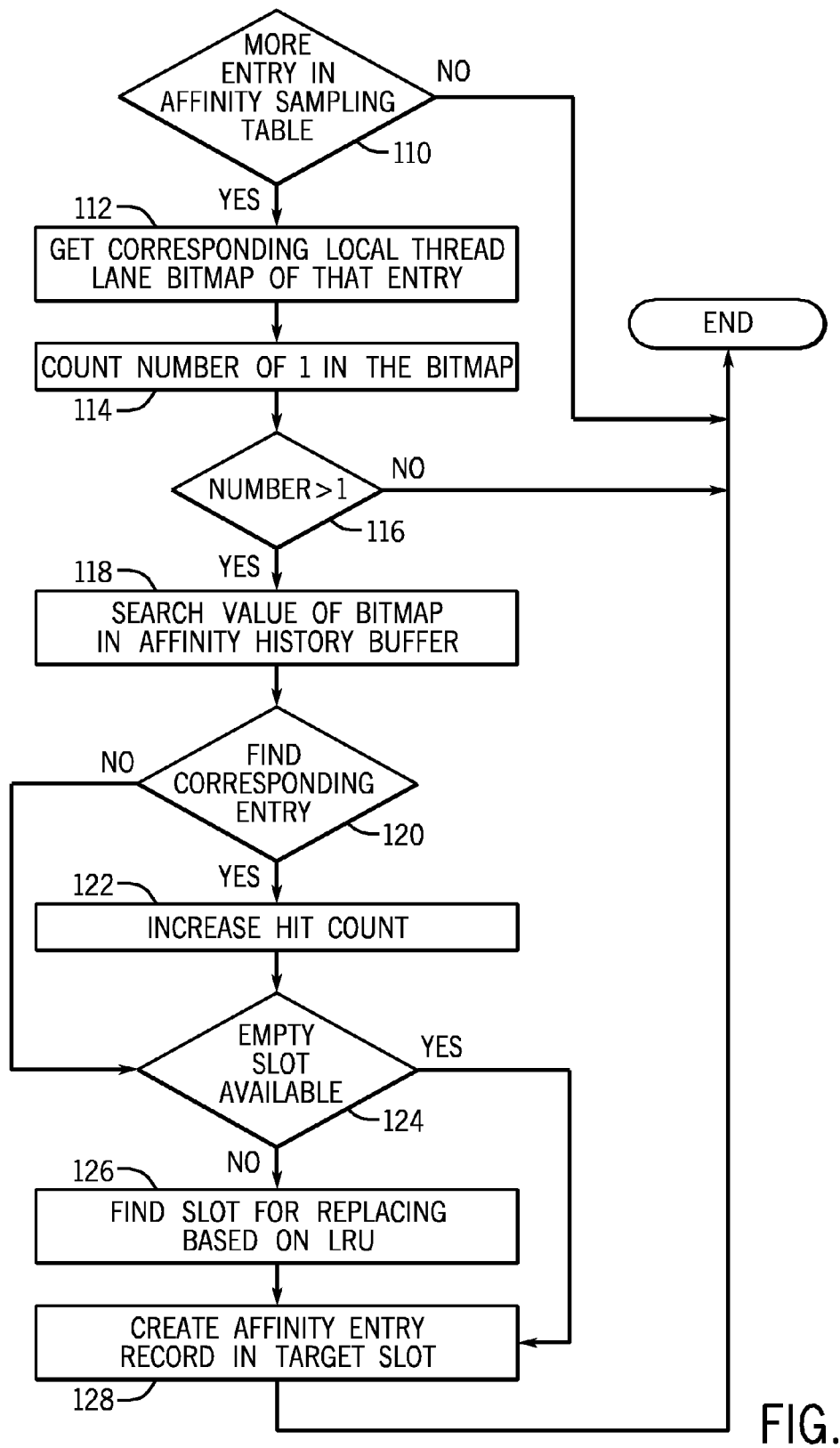
FIG. 10 is a flow chart for affinity history updating in accordance with one embodiment.

FIG. 10 illustrates a sequence which may be implemented in hardware, software, and/or firmware. In software and firmware embodiments, it may be implemented by computer readable instructions stored in a non-transitory computer readable medium such as an optical, magnetic or semiconductor memory.

In order to update the affinity history buffer, the flow starts by determining whether there were more entries in affinity sampling table at diamond 110. If so, the corresponding local thread lane bitmap of that entry is obtained as indicated in block 112. The number of ones in the bitmap is counted in block 114. If that number is greater than one as determined in diamond 116, the value of the bitmap in the affinity history buffer is searched in block 118.

A check at diamond 120 finds the corresponding entry. If so, the hit count is increased in block 122. If not, a check at diamond 124 determines there is an empty slot available. If so, an affinity entry record is created in the target slot as indicated in block 128. Otherwise a slot is found for replacing based on the least recently used entry (block 124).

Figure 11:
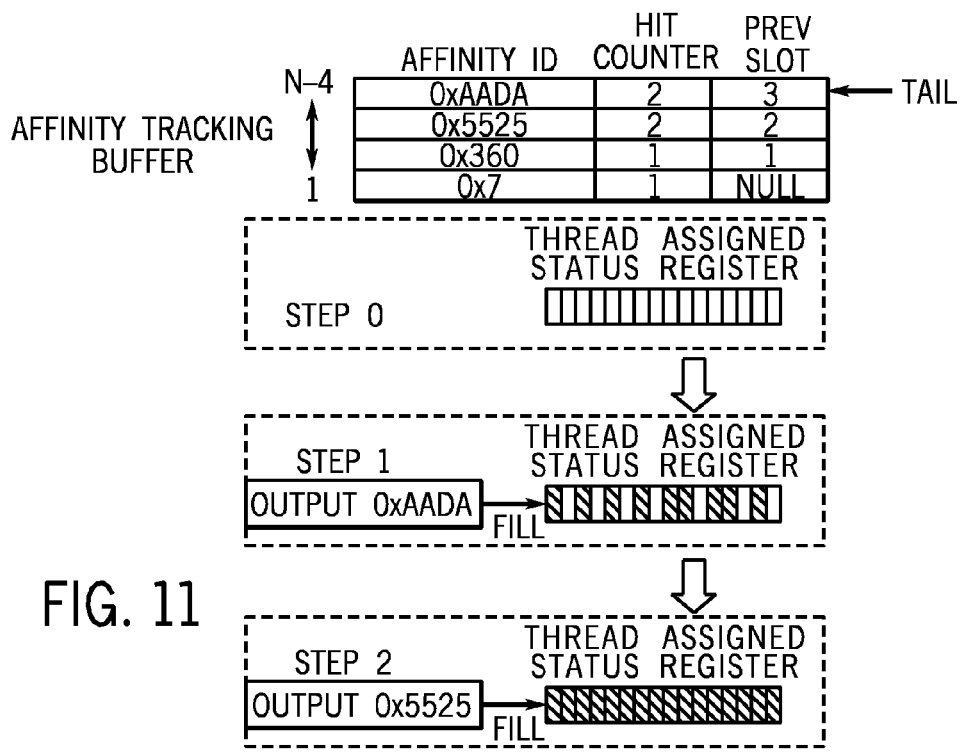
FIG. 11 is a schematic depiction of affinity information output in accordance with one embodiment.

The affinity tracking buffer help puts affinity information if needed. The index field of each entry describes an affinity thread group and a bitmap. An example of the affinity information output is shown in FIG. 11.

Before the output starts, the thread assigns status register is flush to zero. The affinity tracking buffer outputs the entry 0xAADA as a first candidate pointed to by the tail. The 0xAADA does a bit-wise and operation against a thread assigned status register. The result is zero meaning that all threads in the bitmap of 0xAADA are valid. The thread assigned status register is updated with the result of the bit-wise OR operation between the old value and 0xAADA. Then 0x5525 is outputted in the same way. The output procedure stops on the third candidate due to one of its threads being already outputted. A detailed chart is shown in FIG. 12.

Figure 12:
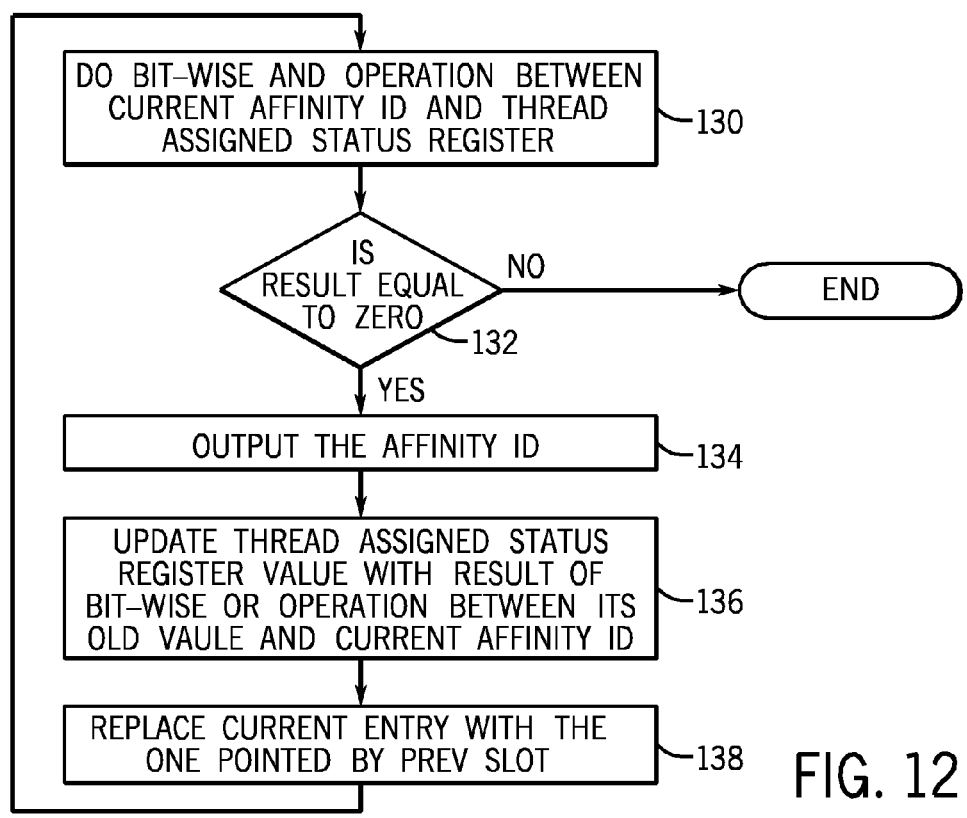
FIG. 12 is a flow chart for affinity information output in accordance with one embodiment.

Referring to FIG. 12, an affinity information output sequence may be implemented in software, firmware and/or hardware. In software and firmware embodiments it may be implemented by computer executed instruction stored in a non-transitory computer readable medium such as a semiconductor, optical or magnetic memory.

The sequence starts at block 130 by doing a bit-wise AND operation between the current affinity identifier and the thread assigned status register. If the result is equal to zero as determined in diamond 132, the affinity identifier is output in block 134. In block 136 the thread assigned status register value is updated with the result of the bit-wise OR operation between its old value and the current affinity identifier. Then in block 138 the current entry is replaced with the one pointed to by previous slot.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
breaking a repetitive graphics processing task into steps, wherein one of the steps is performed in more than one task;
performing the one step across at least two tasks;
identifying affinities between said at least two tasks using address shift logic;

using a driver to configure the address shift logic, said driver to set the number of bits to be shifted based on available cache size, said shift logic to output a memory slice index; and ordering threads performing said at least two tasks to take advantage of affinity between said at least two tasks.

2. The method of claim 1 including denominating threads with the same memory slice index as having affinity.

3. The method of claim 2 including setting up a two-dimensional affinity sampling table whose index field is the memory slice index and whose value field is a local thread lane bitmap that indicates whether the memory slice index equals an entry's index field.

4. The method of claim 3 including clustering threads with affinity in one entry in the table.

5. The method of claim 1 including tracking affinity in a buffer that establishes an ordered linked list to maintain a two-level priority queue for entry replacement.

6. A non-transitory computer readable medium storing instructions to enable a computer to:

break a repetitive graphics processing task into steps, wherein one of the steps is performed in more than one task;

perform the one step across at least two tasks;

identify affinities between said at least two tasks using address sift logic;

use a driver to configure the address shift logic, said driver to set the number of bits to be shifted based on available cache size, said shift logic to output a memory slice index; and order threads performing said at least two tasks to take advantage of affinity between said at least two tasks.

7. The medium of claim 6 further storing instructions to denominate threads with the same memory slice index as having affinity.

8. The medium of claim 7 further storing instructions to set up a two-dimensional affinity sampling table whose index field is the memory slice index and whose value field is a local thread lane bitmap that indicates whether the memory slice index equals an entry's index field.

9. The medium of claim 8 further storing instructions to address cluster threads with affinity in one entry in the table.

10. The medium of claim 6 further storing instructions to track affinity in a buffer that establishes an ordered linked list to maintain a two-level priority queue for entry replacement.

11. An apparatus comprising:

a controller to break a repetitive graphics processing task into steps, wherein one of the steps is performed in more than one task, perform the one step across at least two tasks, identify affinities between said at least two tasks using address shift logic, use a driver to configure the address shift logic, said driver to set the number of bits to be shifted based on available cache size, said shift logic to output a memory slice index, and order threads performing said at least two tasks to take advantage of affinity between said at least two tasks; and a memory coupled to said controller.

12. The apparatus of claim 11 said controller to denominate threads with the same memory slice index as having affinity.

13. The apparatus of claim 12 said controller to set up a two-dimensional affinity sampling table whose index field is the memory slice index and whose value field is a local thread lane bitmap that indicates whether the memory slice index equals an entry's index field.

14. The apparatus of claim 13 said controller to cluster threads with affinity in one entry in the table.

15. The apparatus of claim 11 said controller to track affinity in a buffer that establishes an ordered linked list to maintain a two-level priority queue for entry replacement.

* * * * *